July 7, 1964   J. G. LOWENSTEIN   3,140,305
PREPARATION OF DIISOCYANATES
Filed Dec. 17, 1962
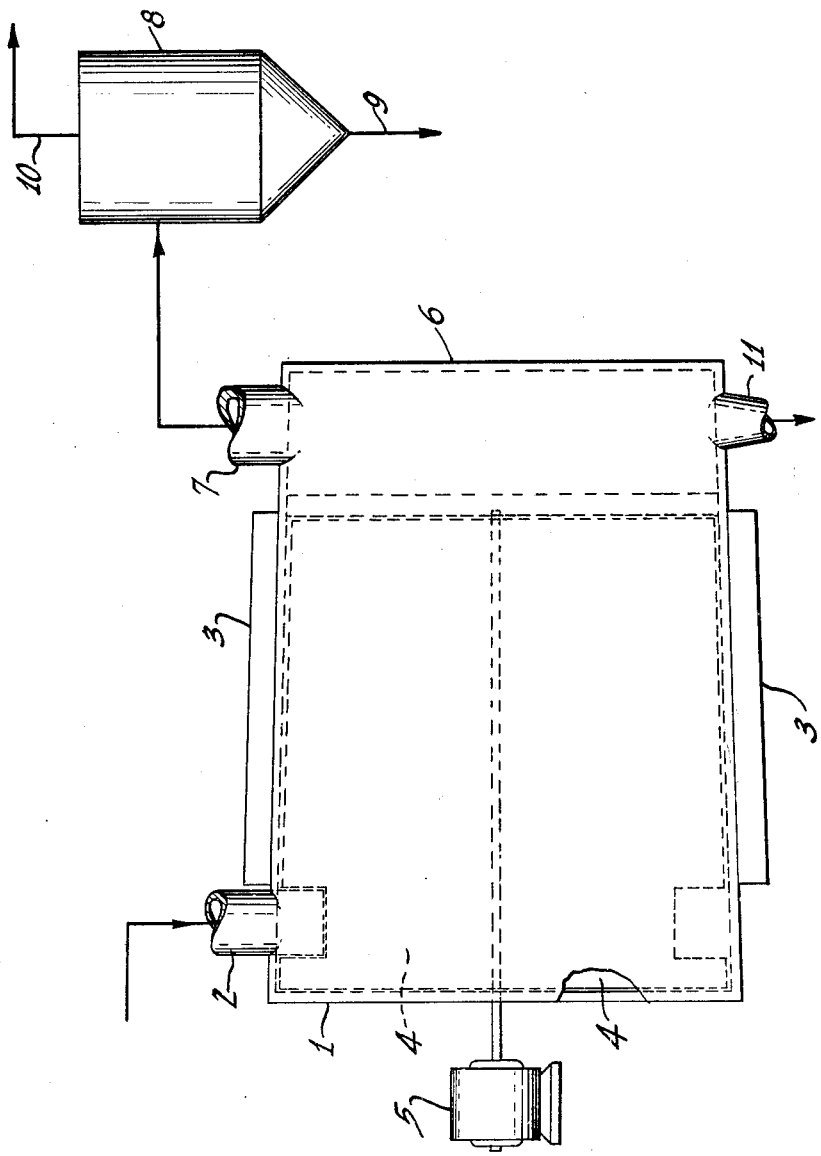
INVENTOR:
JACK G. LOWENSTEIN
BY
ATTORNEYS United States Patent Office 3,140,305
Patented July 7, 1964

3,140,305
PREPARATION OF DIISOCYANATES
Jack G. Lowenstein, Baltimore, Md., assignor to FMC Corporation, New York, N.Y., a corporation of Delaware
Filed Dec. 17, 1962, Ser. No. 245,132
11 Claims. (Cl. 260—453)

This invention relates to a process for recovering a substantially pure aromatic diisocyanate product from a reaction mass, and more particularly it relates to the recovery of toluene diisocyanate from distillation residues.

The phosgenation of non-vicinal aromatic diamines, such as diaminotoluene, yields the corresponding diisocyanates, which are used commercially in making urethane resins. The diisocyanates are normally separated from the phosgenation reaction mass by simple distillation procedures. A portion of the reaction mass composed of high-boiling side-reaction products, including complex ureas, polyureas, polybiurets and isocyanurates, however, does not distill out. This distillation residue represents a lowering in yield of desirable product since it contains a substantial amount of chemically bound diisocyanate in complex molecules. Moreover, some diisocyanate product has to be left behind with the residues solely as a solvent to keep the mass fluid enough to dispose of easily. Sometimes 50% or more of the residual mass may be the valuable product.

In the past, these residues were either discarded or else treated separately to recapture lost diisocyanate values by time-consuming, low-yield processes. One such process, for example, requires heating the residues at high temperatures for long periods of time. Not only is the diisocyanate yield very low, but the severe heating process creates hard crusts of polymerized residue which cannot be readily removed from the distillation unit.

One object of this invention therefore is to furnish a method of utilizing these residues to obtain bound aromatic diisocyanates, without resorting to long, high-temperature recovery methods. Another object is to furnish a method for recovering toluene diisocyanate from plant-process residues by a simple "on-stream" continuous treatment of the residues that can be used in a commercial process.

I have now discovered a means for recovering an aromatic diisocyanate from distillation residues remaining in the reactor after normal distillation of the diisocyanate, as prepared by phosgenating the corresponding aromatic diamine, by feeding the residue as a thin film into a still and removing as overhead vapors, a diisocyanate-rich product. Toluene diisocyanate, which is a preferred reactant for the purpose of this invention, will be used to illustrate my novel method.

I have theorized that these residues, which contain a plurality of isocyanate groups, undergo a form of molecular "rearrangement" when spread out as a thin liquid film and heated under vacuum. A large amount of "combined" toluene diisocyanate will be released and will distill off in a relatively short time and under mild operating temperatures. This new source of toluene diisocyanate is completely surprising since most of these residues had, in the past, represented a serious processing problem.

The major portion of the distillation residue is made up of isocyanate polyureas and biurets, and dimerized diisocyanate. The following reactions presumably occur within the still, at distillation conditions:

Reaction I

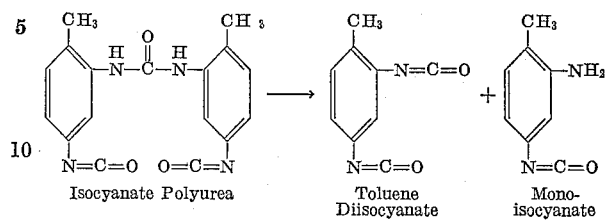

Isocyanate Polyurea     Toluene Diisocyanate     Monoisocyanate

Reaction II

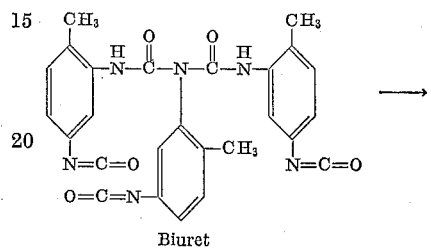

Biuret

Reaction III

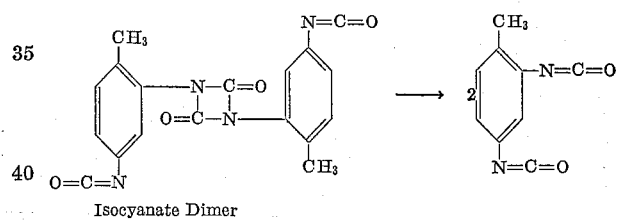

Isocyanate Dimer

In Reaction I, an isocyanate polyurea rearranges to one mole of toluene diisocyanate and one mole of intermediate isocyanate compound. Two moles of the toluene diisocyanate are formed in Reaction II from biuret and in Reaction III from an isocyanate dimer.

In other words, when the residue, in a liquid state from the diisocyanate distillation step, is spread or wiped thinly over a large surface area maintained at conditions under which toluene diisocyanate distills, certain components of the residue will break down to the desired product. The product is then taken off as overhead vapor.

Reference to the accompanying drawing will illustrate how the wiped-film still is utilized in this invention.

The drawing is a cross-sectional elevation view of a typical wiped-film still.

Residue feed from the distillation unit contains sufficient toluene diisocyanate to keep the residue sufficiently fluid. The feed was prepared by stripping the solvent, such as a halogenated benzene, from the phosgenation reaction mass and then distilled to remove a major portion of the diisocyanate product. It is passed into a tapered, wiped-film still 1 through duct 2. The still is surrounded by a steam or oil jacket 3 to attain and control the distillation temperature. Wiper blades 4 are rotated along a horizontal axis by motor 5. The residue is moved rapidly as a thin film along the inner walls of the still. The vaporized materials pass into a separation chamber 6 (a centrifugal separator may optionally be placed between this chamber and the still). The vapor passes out of the separation chamber overhead through duct 7, and into a cyclone separator 8 to remove entrained liquids. Liquids removed from the cyclone are recycled to the feed through line 9, while a substantially pure toluene diisocyanate vapor is removed through line 10. This overhead product may be returned to the main diisocyanate distillation step. The non-volatile material leaves the still through duct 11 and may be discarded or reprocessed. Other types of wiped-film stills, besides the tapered model, having parallel walls, and either vertically or horizontally positioned, may be just as conveniently utilized in the practice of this invention.

For typical phosgenation procedures, I prefer to use techniques substantially as described in U.S. Patent No. 2,908,703 to Latourette and Johnston, October 13, 1959, wherein the initial contact between the reactants is made at a temperature in the range of about 60° to 90° C. either on a batch or continuous basis. However, the distillation residues can be obtained by using any other method of phosgenation; this aspect of the invention is by no means limited to specific phosgenation conditions.

Since the phosgenation reaction is ordinarily performed in organic solvent, such as monochlorobenzene, the solvent is stripped off before distilling the toluene diisocyanate. There is not limit to the amount of diisocyanate removed in the main distillation step, so long as the residue is maintained in a fluid state. The residual material is pumped out of the product still and into the wiped-film still, preferably in a preheated condition. The wiped-film still is maintained under conditions suitable for distilling the diisocyanate at a rate which will not leave the remainder of the residue too viscous to flow. It is most advantageous to use very short residence times in the still to prevent undue thickening of the residues.

The residue, which may contain as much as 90% isocyanate by analysis, is fed into the still under any convenient conditions. For example, the feed may be preheated to about 80° to 115° C. prior to entering the still in order to bring it to reaction conditions in a shorter time. The rate of introducing the feed will depend largely upon the desired rate of removing overhead vapors at the other end of the still. I prefer to admit the feed at a rate of about 20 to 80 pounds per hour per square foot of effective surface area in the still. The effective heating area of the still may vary as desired.

Jacket temperatures can be varied to suit processing conditions. I prefer to keep jacket temperatures at from about 150° to 200° C. Extremely high temperatures within the still may cause decomposition of the reaction mass. The still is preferably operated under vacuum, at 0.75 to 5 mm. of mercury. Higher temperatures and corresponding pressures may be used with some sacrifice of yield.

When the liquid feed enters the still, the wiper blades spread it rapidly over the inner surface in a thin film, causing thereby a certain amount of turbulence. This turbulent film flow is advantageous because it promotes heat transfer through the film. As a result, distillation rates are high and residence times are minimal. The blades may be adjusted to permit any desired film thickness, usually between 1/32 and 5/64 of an inch. The feed is whirled across the heated inner surface and non-volatiles eventually are forced into the exit chamber, along with vaporized materials. Owing to the small depth and large area of the mass being exposed to heat, reaction and subsequent volatilization occurs rapidly enough to permit continuous operation of the still. In fact, this still can be operated simultaneously with the main distillation unit. The bottom residues from that unit can be continuously fed into the wiped-film still.

The temperature of the vapor leaving the still is preferably in the range of about 100° to 140° C.; an average evaporation rate of about 1.5 to 2.0 pounds of toluene diisocyanate per hour per square foot per degree Fahrenheit should be obtained. The rate could be changed, if desired, by varying the temperature, pressure, blade clearance, and blade speed. I find that under these preferred conditions, the overhead vapors will contain from 98% to 100% toluene diisocyanate.

The bottoms liquid is a viscous, tarry material which generally has just enough fluidity to drain from the still by gravity. The rate of material flow through the still is enough to prevent the diisocyanate-thin residues from being baked onto the still surface. The temperature of this material is in the range of 140° to 165° C., and contains only about 25% isocyanate (calculated as toluene diisocyanate, substantially according to ASTM D1638–61T).

As illustrated in the tabulated data below, a large amount of valuable diisocyanate product can be recovered from the diisocyanate distillation residue.

After reaction between phosgene and diaminotoluene, in the presence of monochlorobenzene, the solvent carrier and trace amounts of phosgene were stripped off from the reaction mass. The toluene diisocyanate product was then distilled in a distillation column under 10 mm. mercury (absolute) at a temperature in the range of 120° to 137° C. About two-thirds of all diisocyanate was removed and collected. The remaining residue, containing about 84.6% isocyanate (reported as toluene diisocyanate) was heated and fed to a one square foot wiped-film evaporator with a wiper blade rotational velocity of 1400 r.p.m. An average film thickness of about 1/16 of an inch was used. The residence time of the mass in the still ranged from 15 to 30 seconds.

| Run Number | 1 | 2 | 3 | 4 | 5 | 6 | 7 |
|---|---|---|---|---|---|---|---|
| Feed rate, lbs./hr | 33 | 33 | 32 | 61 | 69 | 75 | 23 |
| Temperature, °C.: | | | | | | | |
| Feed | 107 | 105 | 107 | 94 | 90 | 88 | 109 |
| Jacket | 166 | 168 | 171 | 153 | 156 | 154 | 158 |
| Vapor | 125 | 126 | 127 | 117 | 116 | 114 | 115 |
| Bottoms | 158 | 160 | 162 | 141 | 141 | 132 | 151 |
| Pressure, mm. Hg, abs. (throughout system) | 4.8 | 4.8 | 4.8 | 4.6 | 4.6 | 4.6 | 0.9 |
| Percent Feed Evaporated | 81.2 | 83.0 | 81.8 | 77.8 | 77.3 | 75.9 | 82.9 |
| Overhead Analysis: | | | | | | | |
| Percent TDI | 98.8 | 99.1 | 100.6 | 100.7 | 100.3 | 98.9 | 98.7 |
| Percent Hydrolyzable Chlorine Group | 0.01 | 0.0 | 0.01 | 0.01 | 0.01 | 0.03 | 0.04 |
| Bottoms Analysis: | | | | | | | |
| Percent Isocyanate (as TDI) | 27.8 | 28.8 | 25.6 | 24.7 | 24.4 | 28.0 | 29.7 |
| Percent Volatile Material | 0.0 | 22.0 | 24.0 | 28.0 | 30.0 | 35.0 | 0.0 |
| Percent Hydrolyzable Chlorine Group | 0.7 | 0.8 | 0.9 | 0.7 | 0.9 | 0.7 | 0.9 |

(The term "TDI" above denotes toluene diisocyanate.)

The toluene diisocyanate so produced was a mixture of 80% by weight of 2,4-toluene diisocyanate and 20% of 2,6-toluene diisocyanate.

From the above data it may be seen that the conversion of distillation residues to toluene diisocyanate in the wiped-film still is remarkably high. The results show that a large amount of valuable product can be recaptured from an otherwise waste by-product.

Another advantage in utilizing my method of distillation is the improvement in handling the residues. The bottoms product, although rather viscous, can be removed from the still at the same time in which the desirable overhead product is evaporated. In conventional equipment, the residue would have to be kept in the still until the product is distilled. The removal of the bottoms product is performed while it is still fluid enough to leave the still by gravity.

This novel process applies equally to phenylene and other aromatic diisocyanates, including the position isomers, a swell as to 2,4-, 2,6-, and mixtures of 2,4- and 2,6-toluene diisocyanates. The presence of other non-reactive substituents on the aromatic nucleus should not affect the recovery of diisocyanate complexes, formed during the phosgenation of the aromatic diamines, from distillation residues.

Having described by invention, I claim:

1. A process for the recovery of an aromatic diisocyanate from an aromatic diisocyanate distillation residue comprising passing said residue in the form of a thin film over a heated surface, thereby converting isocyanate-containing aromatic compounds present in the residue to an aromatic diisocyanate and distilling said aromatic diisocyanate therefrom.

2. A process for the recovery of an aromatic diisocyanate from a reaction mass residue comprising the steps of
    (1) reacting an aromatic diamine with phosgene and distilling off a portion of the aromatic diisocyanate so produced,
    (2) passing the remaining residue into a second distillation vessel in which
        (a) the residue is distributed upon the inner surface of said vessel as a thin film, and
        (b) the film is subjected to a temperature and vacuum sufficient to evaporate the aromatic diisocyanate, and
    (3) removing as vapors from said vessel, a vapor substantially rich in aromatic diisocyanate.

3. The process of claim 2, wherein the aromatic diisocyanate is toluene diisocyanate.

4. The process of claim 3, wherein the residue is passed into the distillation vessel at a temperature in the range of 80° to 115° C.

5. The process of claim 3, wherein the toluene diisocyanate is vaporized at a temperature in the range of 100° to 135° C.

6. The process of claim 3, wherein the residue contains up to 90% toluene diisocyanate by weight.

7. The process of claim 3, wherein the distillation vessel is maintained under an absolute vacuum of 0.75 to 5 mm. of mercury.

8. A process for the preparation of toluene diisocyanate from a distillation residue comprising the steps of
    (1) passing into a distillation vessel from 20 to 80 pounds per hour of the distillation residue, obtained by
        (a) reacting diaminotoluene with phosgene, and
        (b) distilling off a portion of the toluene diisocyanate so produced,
    (2) spreading the residue as a thin film upon the inner surface of said vessel by means of rotating wiper blades at an elevated temperature, causing toluene diisocyanate to form,
    (3) distilling off toluene diisocyanate at a temperature in the range of 100° to 135° C., and
    (4) discarding as a bottoms product, the non-volatilized substances.

9. The process of claim 8, wherein the bottoms product contains less than 30% isocyanates.

10. The process of claim 8, wherein the thickness of the thin film is in the range of $\frac{1}{32}$ to $\frac{5}{64}$ of an inch.

11. The process of claim 8, wherein the toluene diisocyanate distilling off is selected from the group consisting of 2,4-toluene diisocyanate, 2,6-toluene diisocyanate, and a mixture of 2,4- and 2,6-toluene diisocyanates.

No references cited.